United States Patent
Lei et al.

(10) Patent No.: US 11,849,456 B2
(45) Date of Patent: Dec. 19, 2023

(54) CONSTRUCTION AND MAPPING OF COMPACT UPLINK CONTROL INFORMATION (UCI) OVER PHYSICAL UPLINK SHARED CHANNEL (PUSCH)

(71) Applicant: QUALCOMM Incorporated, San Diego, CA (US)

(72) Inventors: Jing Lei, San Diego, CA (US); Wanshi Chen, San Diego, CA (US); Yi Huang, San Diego, CA (US); Yisheng Xue, San Diego, CA (US); Seyong Park, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/936,936

(22) Filed: Sep. 30, 2022

(65) Prior Publication Data

US 2023/0021753 A1     Jan. 26, 2023

Related U.S. Application Data

(63) Continuation of application No. 16/947,361, filed on Jul. 29, 2020, now Pat. No. 11,540,258.

(Continued)

(51) Int. Cl.
*H04W 72/21* (2023.01)
*H04L 1/00* (2006.01)
(Continued)

(52) U.S. Cl.
CPC .......... *H04W 72/21* (2023.01); *H04L 1/0061* (2013.01); *H04W 72/0446* (2013.01);
(Continued)

(58) Field of Classification Search
CPC ............. H04W 72/21; H04W 72/0446; H04W 72/0453; H04W 72/0466; H04W 72/23;
(Continued)

(56) References Cited

U.S. PATENT DOCUMENTS 11,540,258 B2 * 12/2022 Lei .................. H04W 72/21
11,601,249 B2 *  3/2023 Yang ................ H04W 72/21
(Continued)

FOREIGN PATENT DOCUMENTS

EP     3952510 A1 *  2/2022 ............ H04W 72/02
EP     3952510 A1    2/2022
EP     3952582 A1    2/2022

OTHER PUBLICATIONS

Huawei., et al., "Discussion on Channel Structure of 2-Step RACH", 3GPP Draft, 3GPP TSG RAN WG1 Meeting #97, R1-1906050, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727507, 12 Pages, Retrieved from the Internet: URL:http://www.3gpp.org/ftp/Meetings%5F3GPP%5FSYNC/RAN1/Docs/R1%2D1906050%2Ezip [retrieved on May 13, 2019] paragraph [03.2], paragraph [05.4], figure 7.

(Continued)

*Primary Examiner* — Brian T O Connor
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine to transmit a compact uplink control information (UCI) that identifies one or more parameters associated with a transmission of a physical uplink shared channel (PUSCH) communication in a PUSCH resource unit (PRU). The UE may transmit the UCI in the PRU based at (Continued)

least in part on a semi-static payload construction and resource mapping rule. Numerous other aspects are provided.

28 Claims, 10 Drawing Sheets

Related U.S. Application Data

(60) Provisional application No. 62/880,712, filed on Jul. 31, 2019.

(51) Int. Cl.
*H04W 72/0446* (2023.01)
*H04W 72/0453* (2023.01)
*H04W 72/044* (2023.01)
*H04W 74/08* (2009.01)
*H04W 72/23* (2023.01)
*H04W 72/53* (2023.01)
*H04W 72/232* (2023.01)

(52) U.S. Cl.
CPC ... *H04W 72/0453* (2013.01); *H04W 72/0466* (2013.01); *H04W 72/23* (2023.01); *H04W 72/53* (2023.01); *H04W 74/0833* (2013.01); *H04W 72/232* (2023.01)

(58) Field of Classification Search
CPC ............. H04W 72/53; H04W 74/0833; H04W 72/232; H04L 1/0061
See application file for complete search history.

(56) References Cited

U.S. PATENT DOCUMENTS

| | | | |
|---|---|---|---|
| 2020/0120696 A1* | 4/2020 | Wu | H04L 5/0092 |
| 2020/0296742 A1 | 9/2020 | Hao et al. | |
| 2020/0383132 A1* | 12/2020 | Yang | H04W 72/0453 |
| 2021/0037517 A1 | 2/2021 | Lei et al. | |
| 2021/0084643 A1 | 3/2021 | Gao et al. | |
| 2021/0266911 A1 | 8/2021 | Zhao | |
| 2021/0345385 A1* | 11/2021 | Karaki | H04W 72/21 |
| 2021/0352655 A1 | 11/2021 | Xiong et al. | |
| 2021/0377976 A1* | 12/2021 | Karaki | H04W 16/14 |
| 2021/0385855 A1* | 12/2021 | Talarico | H04L 5/0055 |
| 2022/0174722 A1* | 6/2022 | Talarico | H04W 72/23 |
| 2022/0200734 A1* | 6/2022 | Karaki | H04L 1/1864 |

OTHER PUBLICATIONS

International Preliminary Report on Patentability—PCT/US2020/070328 The International Bureau of WIPO—Geneva, Switzerland, Feb. 10, 2022.
International Search Report and Written Opinion—PCT/US2020/070328—ISA/EPO—Sep. 24, 2020.
Qualcomm Incorporated: "Channel Structure for Two-Step RACH", 3GPP Draft, R1-1907691, 3GPP TSG-RAN WG1 Meeting #97, Channel Structure for Two-Step RACH, 3rd Generation Partnership Project (3GPP), Mobile Competence Centre, 650, Route Des Lucioles, F-06921, Sophia-Antipolis, Cedex, France, vol. RAN WG1, No. Reno, USA, May 13, 2019-May 17, 2019, May 16, 2019 (May 16, 2019), XP051739977, pp. 1-20.

* cited by examiner

CONSTRUCTION AND MAPPING OF COMPACT UPLINK CONTROL INFORMATION (UCI) OVER PHYSICAL UPLINK SHARED CHANNEL (PUSCH)

CROSS-REFERENCE TO RELATED APPLICATIONS

This application is a continuation of U.S. patent application Ser. No. 16/947,361, filed Jul. 29, 2020, which claims priority to U.S. Provisional Patent Application No. 62/880,712, filed on Jul. 31, 2019, entitled "CONSTRUCTION AND MAPPING OF COMPACT UPLINK CONTROL INFORMATION (UCI) OVER PHYSICAL UPLINK SHARED CHANNEL (PUSCH)," and assigned to the assignee hereof. The contents of each are incorporated herein by reference in their entireties.

FIELD OF THE DISCLOSURE

Aspects of the present disclosure generally relate to wireless communication and to techniques and apparatuses for constructing, mapping and transmitting compact uplink control information (UCI) in a semi-static way over a physical uplink shared channel (PUSCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining to transmit uplink control information (UCI) that identifies one or more parameters associated with a transmission of a physical uplink shared channel (PUSCH) communication in a PUSCH resource unit (PRU); and transmitting the UCI in the PRU based at least in part on determining to transmit the UCI.

In some aspects, a UE for wireless communication may include memory and one or more processors coupled with the memory. The memory and the one or more processors may be configured to determine to transmit UCI that identifies one or more parameters associated with a transmission of a PUSCH communication in a PRU and transmit the UCI in the PRU based at least in part on determining to transmit the UCI.

In some aspects, a non-transitory computer-readable medium may store one or more instructions for wireless communication. The one or more instructions, when executed by one or more processors of a UE, may cause the one or more processors to: determine to transmit UCI that identifies one or more parameters associated with a transmission of a PUSCH communication in a PRU and transmit the UCI in the PRU based at least in part on determining to transmit the UCI.

In some aspects, an apparatus for wireless communication may include means for determining to transmit UCI that identifies one or more parameters associated with a transmission of a PUSCH communication in a PRU and means for transmitting the UCI in the PRU based at least in part on determining to transmit the UCI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
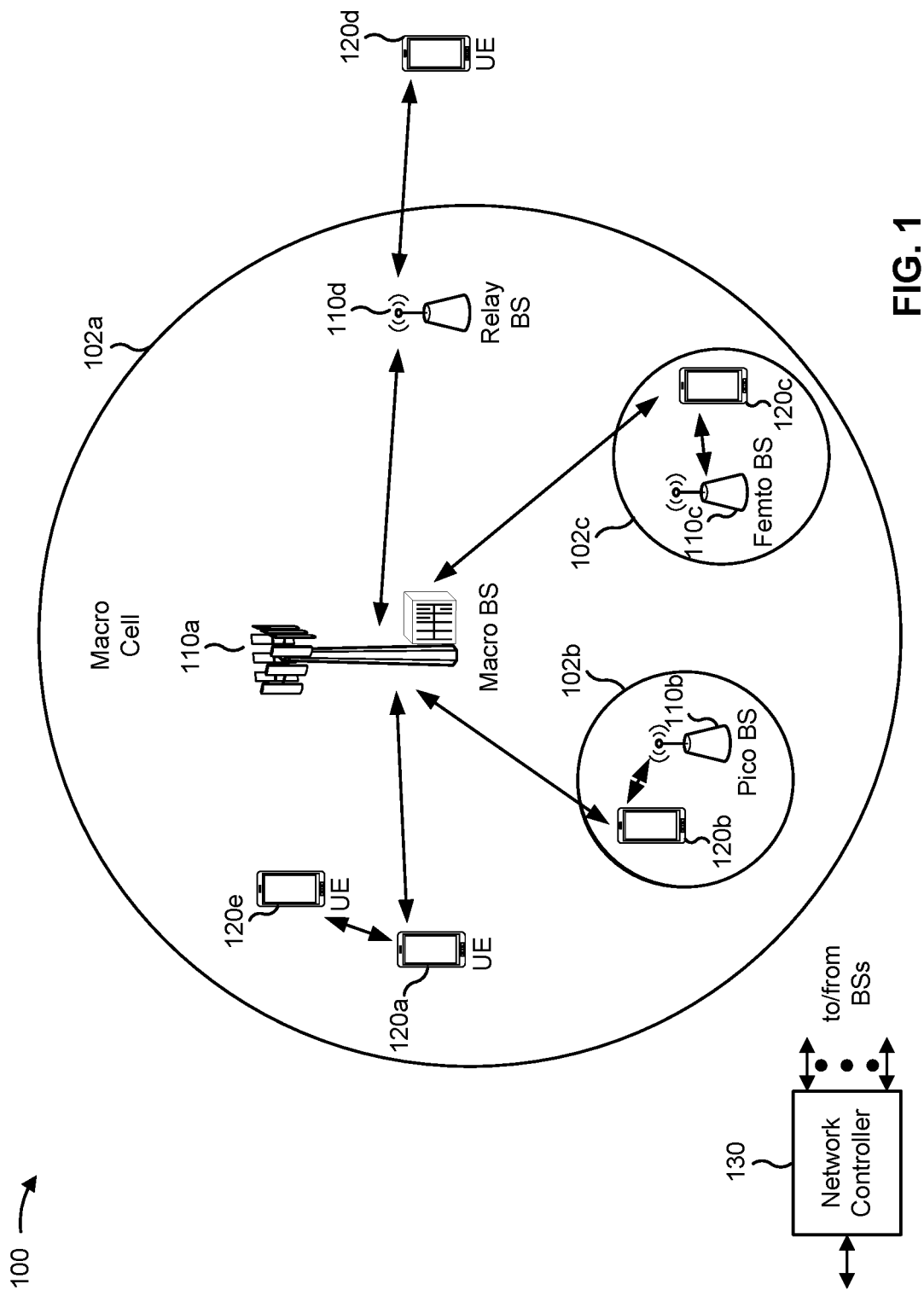
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
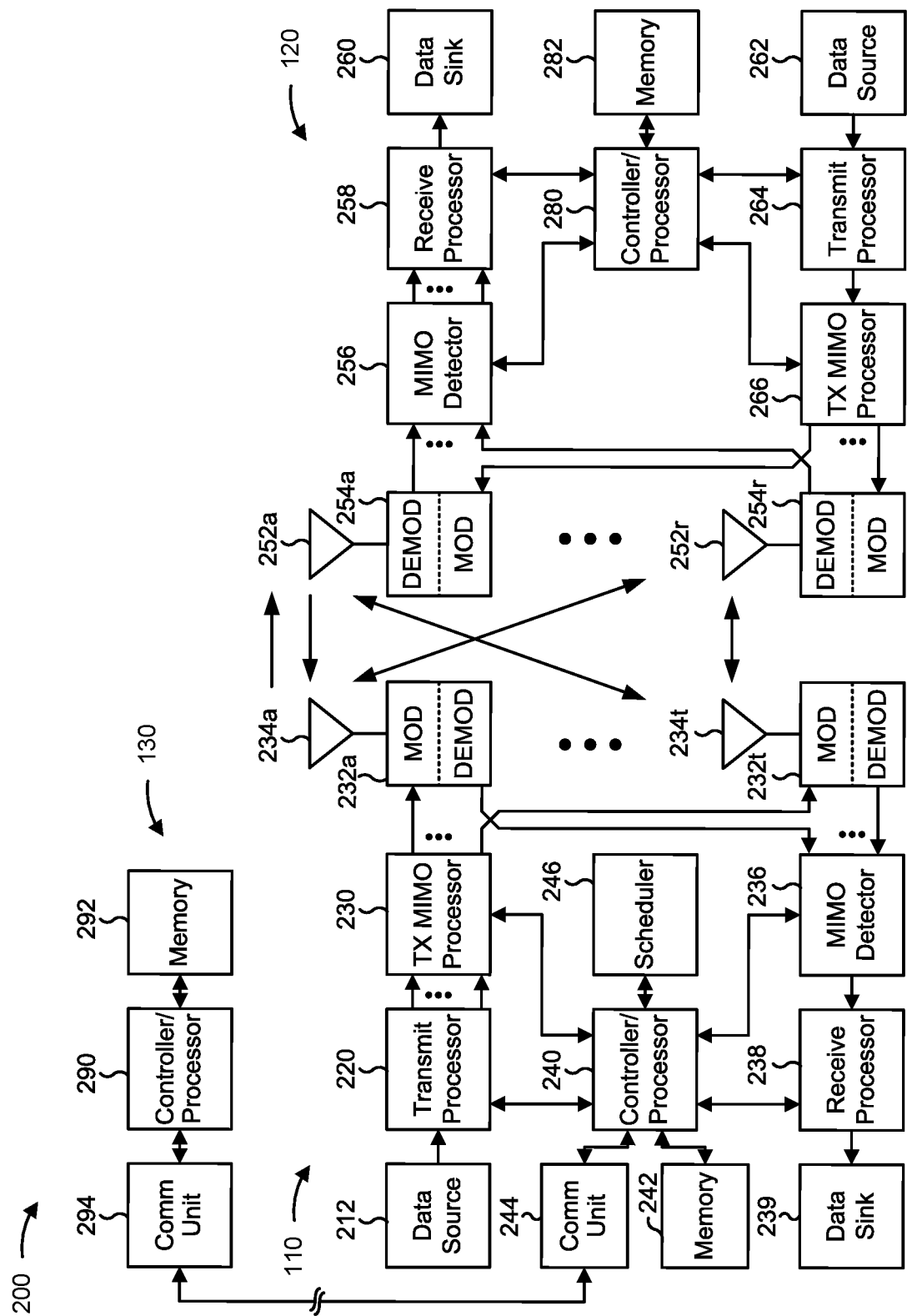
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting uplink control information (UCI) over a physical uplink shared channel (PUSCH), as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9 and/or other processes as described herein. A scheduler 246 may schedule UEs for data transmission on the downlink and/or uplink.

In some aspects, UE 120 may include means for determining to transmit UCI that identifies one or more parameters associated with a transmission of a PUSCH communication in a PUSCH resource unit (PRU), means for transmitting the UCI in the PRU based at least in part on determining to transmit the UCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
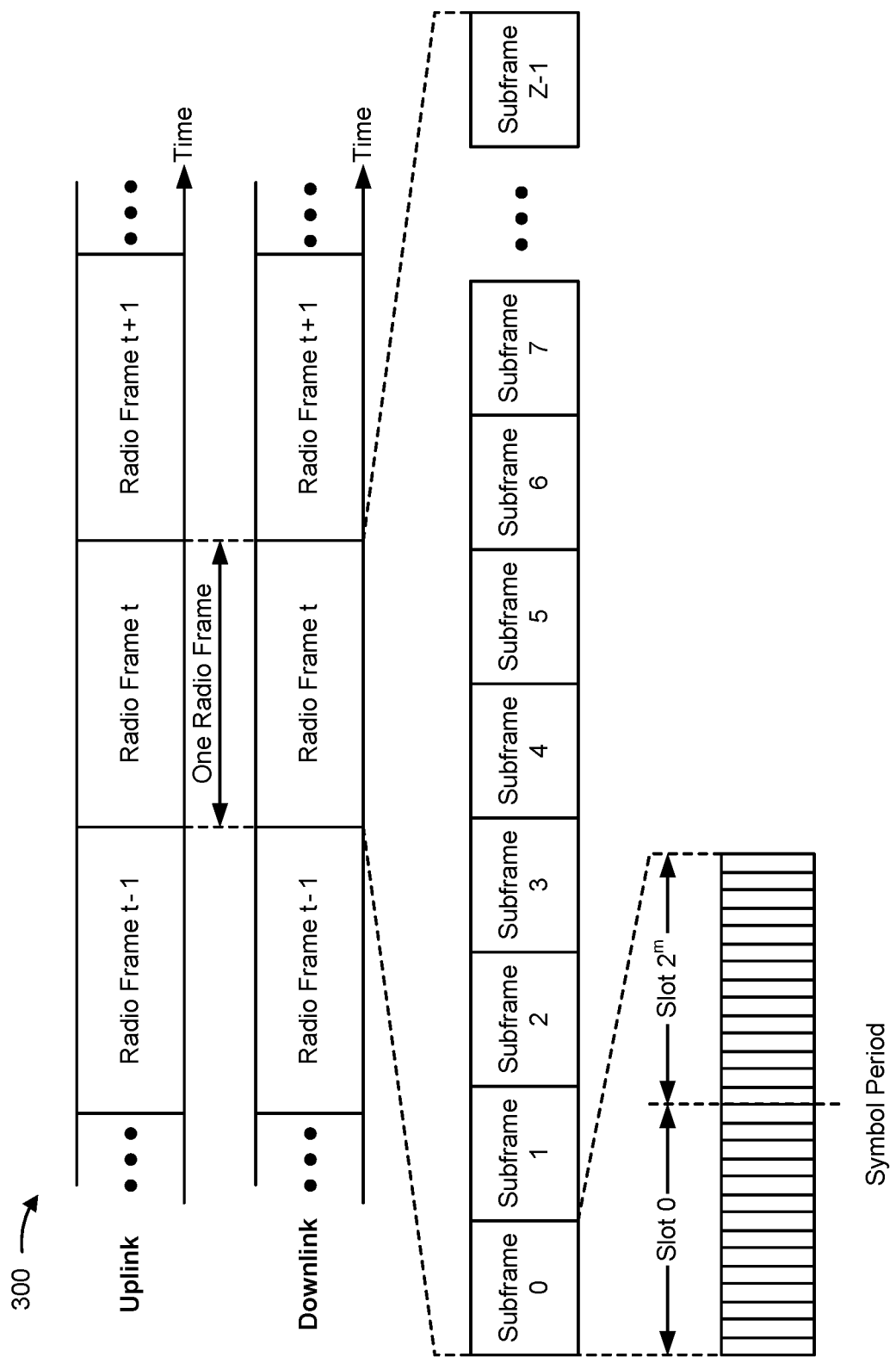
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
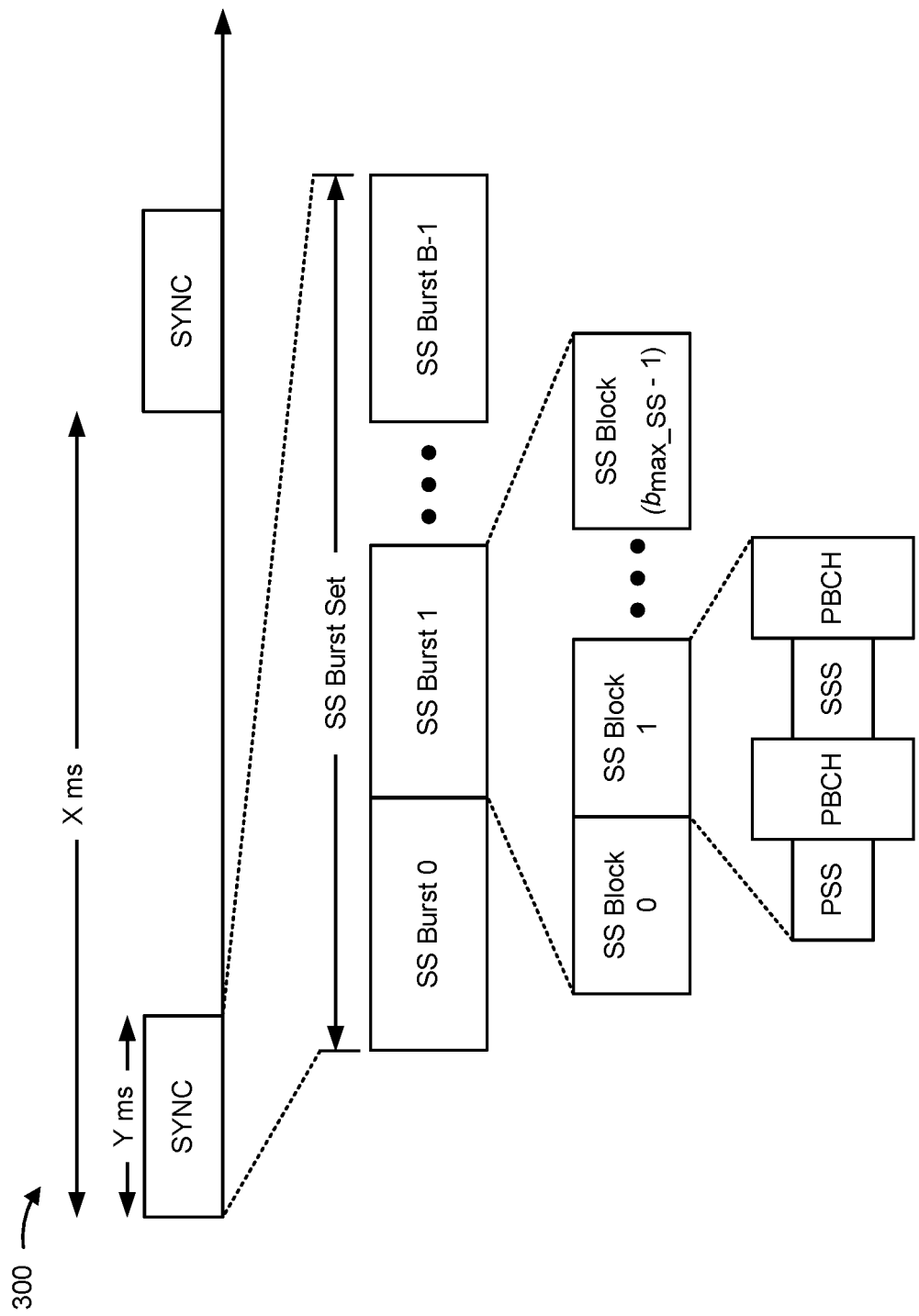
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
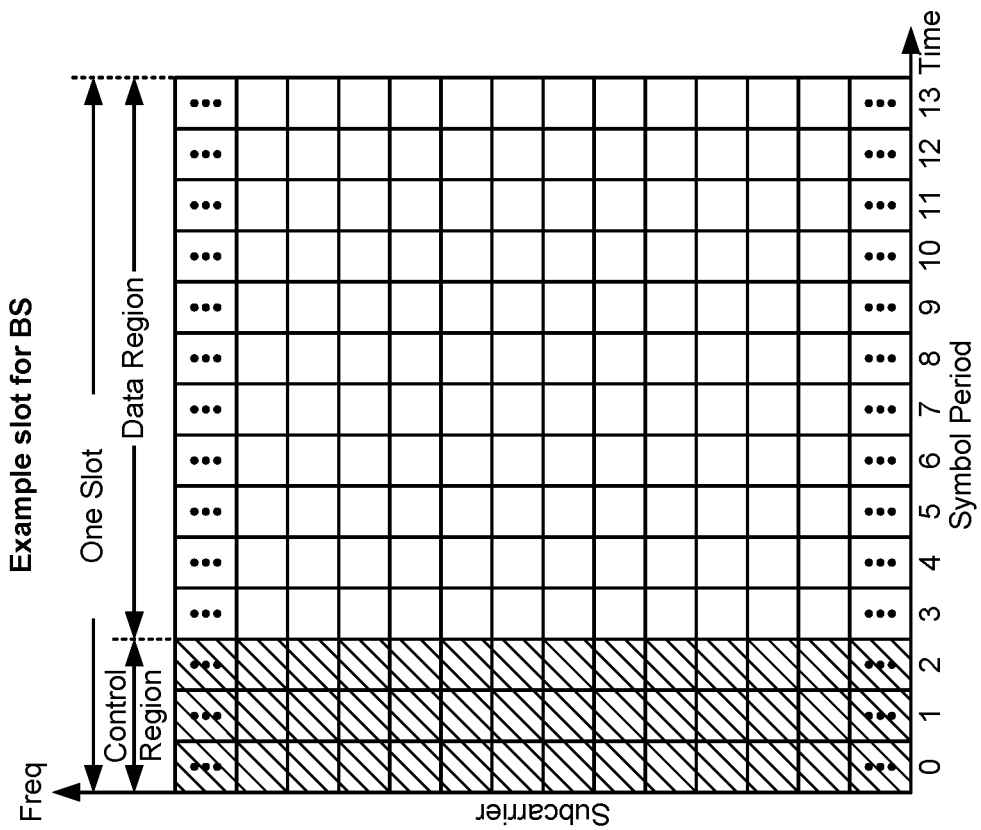
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE may communicate with a BS on a wireless communication link by receiving one or more downlink communications from the BS on a downlink of the wireless communication link, transmitting one or more uplink communications to the BS on an uplink of the wireless communication link, and/or the like. To transmit an uplink communication, the UE may process payload data of the uplink communication (e.g., channel code the payload data, rate match the payload data, scramble the payload data, modulate the payload data, and/or the like) based at least in part on one or more transmission parameters. The transmission parameters may include a modulation coding scheme for modulating the payload data, a redundancy version for rate matching the payload data, a transport block size for the payload data, and/or the like.

In some cases, the BS may specify the transmission parameters to the UE such that the BS is aware of the transmission parameters. The BS may demodulate, decode, and/or otherwise process the uplink communication based at least in part on the transmission parameters. In some cases, the BS may be unaware of transmission parameters that the UE used to generate and/or transmit an uplink communication. For example, the BS may provide the UE with a plurality of candidate transmission parameters from which the UE selects the transmission parameters for the uplink communication. As another example, the UE may be provided with a table, on algorithm, and/or the like, which the UE may use to determine the transmission parameters. As a result, the BS may attempt to process the uplink communication by iterating through candidate transmission parameters in order to attempt to demodulate and/or decode the uplink communication, which increases processing times of uplink communications, increases consumption of memory and/or processing resources of the BS, and/or the like. Moreover, if the BS is unable to determine the transmission parameters, the BS may be unable to demodulate, decode, and/or otherwise process the uplink communication, which may result in an increase in dropped uplink communications at the BS, an increase in the quantity of uplink retransmissions, and/or the like.

Some aspects described herein provide techniques and apparatuses associated with transmitting UCI over PUSCH. In some aspects, a UE may determine one or more transmission parameters for processing and/or transmitting an uplink communication to a BS. The UE may transmit, to the BS, an indication of the one or more transmission parameters in UCI associated with the uplink communication. As an example, the uplink communication may include a PUSCH communication that is transmitted in a PRU. A PRU may include a set of time-domain and/or frequency-domain resources configured to carry the PUSCH communication and an associated demodulation reference signal (DMRS). In this case, the UE may determine one or more transmission parameters (e.g., modulation coding scheme, transport block size, redundancy version, and/or the like) for processing and/or transmitting the PUSCH communication, may generate UCI that identifies the one or more transmission parameters, and may multiplex the UCI, the PUSCH communication, and the associated DMRS in the PRU.

In this way, the BS may receive the UCI, the PUSCH communication, and the DMRS, may identify the one or more transmission parameters based at least in part on the UCI, and may demodulate, decode, and/or otherwise process the PUSCH communication based at least in part on the one or more transmission parameters, DMRS, and/or the like. This increases the efficiency of processing the uplink communication at the BS (e.g., by reducing demodulation and/or decoding attempts based at least in part on candidate transmission parameters), decreases dropped and/or delayed uplink communications, decreases retransmissions, and/or the like.

Figure 5:
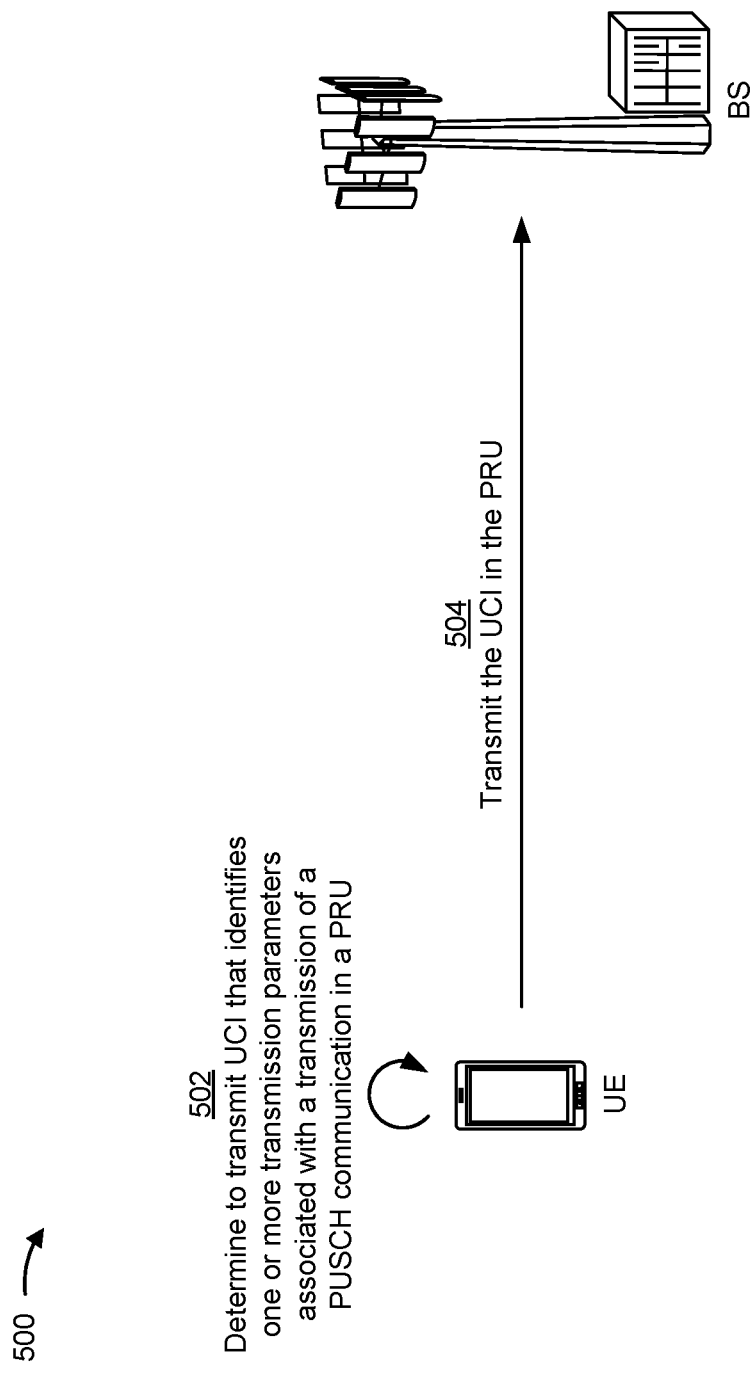
FIGS. 5-8 are diagrams illustrating examples of transmitting uplink control information (UCI) over a physical uplink shared channel (PUSCH), in accordance with various aspects of the present disclosure.

FIG. 5 is a diagram illustrating one or more examples 500 of transmitting UCI over PUSCH, in accordance with various aspects of the present disclosure. As shown in FIG. 5, examples 500 may include communication between a UE (e.g., UE 120) and a BS (e.g., BS 110). In some aspects, the BS and the UE may be included in a wireless network, such as wireless network 100 and/or another wireless network.

The BS and the UE may communicate via a wireless access link, which may be configured with a frame structure (e.g., frame structure 300 and/or another frame structure), a slot format (e.g., slot format 410 and/or another slot format), and/or the like. The access link may include an uplink and a downlink.

In some cases, the UE may transmit an uplink communication, such as a PUSCH communication, a physical uplink control channel (PUCCH) communication, and/or the like to the BS on the uplink. For example, the UE may perform a random access channel (RACH) procedure to communicatively connect with the BS, and may transmit a PUSCH communication to the BS as part of the RACH procedure. The RACH procedure may include a contention-based RACH procedure, a contention-free RACH procedure, a two-step RACH procedure, and/or the like. The UE may transmit a RACH preamble in a msg1 communication and a radio resource control (RRC) connection request in a msg3 communication (e.g., which may be a PUSCH communication) for a four-step RACH procedure, may include a msgA communication (e.g., which may be a PUSCH communication) in a two-step RACH procedure that includes a RACH preamble portion and a payload portion, and/or the like.

As another example, the BS may configure the UE with a configured grant, which may schedule periodic and/or semi-persistent resources (e.g., time-domain resources, frequency-domain resources, and/or the like) for transmitting uplink communications to the BS, and the UE may use the resources to transmit PUSCH communications to the BS.

The UE may transmit a PUSCH communication in a PRU. As indicated above, a PRU may include a set of time-domain and/or frequency-domain resources configured to carry PUSCH communications, DMRSs, and/or other uplink communications. In some aspects, the PRU may be associated with a particular RACH occasion in which the UE transmits a RACH preamble in a RACH procedure, such as for a contention-based RACH procedure. In some aspects, the UE may identify the PRU based at least in part on an indication of the PRU in a downlink control information (DCI) communication (e.g., a compact DCI communication, a group-common DCI communication, and/or the like), received from the BS, that configures contention-free RACH procedure resources. In some aspects, a PRU may be configured by a configured grant, in which case the UE may identify the PRU based at least in part on an indication of the PRU in an RRC communication received from the BS, a medium access control (MAC) control element (MAC-CE) communication received from the BS, and/or the like.

In some aspects, a PRU may be included in a PRU group along with one or more other PRUs. In this case, the UE and/or other UEs may select respective PRUs from the PRU group and may transmit PUSCH communications, DMRSs, and/or other uplink communications in the respective PRUs.

As shown in FIG. 5, and by reference number 502, the UE may determine to transmit UCI associated with a PUSCH communication (which may be referred to as UCI-on-PUSCH, UCI piggyback, and/or the like) that is to be transmitted to the BS. The UE may configure the UCI to identify one or more transmission parameters associated with transmission of the PUSCH communication. The one or more transmission parameters may include, for example, a modulation coding scheme associated with the PUSCH communication, a redundancy version associated with the PUSCH communication, a transport block size associated with the PUSCH communication, and/or other parameters associated with coding, modulating, and/or otherwise processing the PUSCH communication for transmission to the BS.

In some aspects, the one or more transmission parameters may be identified in the UCI by a modulation coding scheme index and/or another type of modulation coding scheme identifier, a redundancy version index and/or another type of redundancy version identifier, a transport block size index and/or another type of transport block size identifier, and/or the like.

In some aspects, the UE may determine to transmit the UCI to identify the one or more transmission parameters to the BS so that the BS is enabled to demodulate, decode, and/or otherwise process the PUSCH communication. In some aspects, the UE may determine to transmit the UCI to identify the one or more transmission parameters based at least in part on determining that the BS may be unaware of the one or more transmission parameters, may be unable to determine the one more transmission parameters, may be unable to determine the one or more transmission parameters without a large amount of iteration through candidate transmission parameters, and/or the like.

For example, the UE may determine to transmit the UCI to identify the one or more transmission parameters based at least in part on determining that the PRUs, in the PRU group in which the PRU is included, at least partially overlap, fully overlap, are mapped and/or configured to the same and/or shared sets of time-domain and/or frequency-domain resources, and/or the like. As another example, the UE may determine to transmit the UCI to identify the one or more transmission parameters based at least in part on determining that the PRUs, in the PRU group in which the PRU is included, are nested such that the PRUs start at the same time-domain resource and/or the same frequency domain resource.

As another example, if the PUSCH communication includes a payload portion of a msgA communication in a RACH procedure, the UE may determine to transmit the UCI to identify the one or more transmission parameters based at least in part on determining that the combination of the PRU and the associated RACH occasion for transmitting the RACH preamble portion of the msgA communication is associated with a plurality of different candidate transmission parameters and/or a plurality of different combinations of candidate transmission parameters. As another example, if the PUSCH communication includes a payload portion of a msgA communication in a contention-based RACH procedure, the UE may determine to transmit the UCI to identify the one or more transmission parameters based at least in part on determining that the contention-based RACH procedure is triggered by a contention-based random access event (e.g., based at least in part on determining to perform the contention-based RACH procedure, based at least in part on detecting a collision in the contention-based RACH procedure, and/or the like).

As another example, if the PUSCH communication (and/or the PRU in which the UE is to transmit the PUSCH communication) is scheduled by a configured grant, the UE may determine to transmit the UCI to identify the one or more transmission parameters based at least in part on determining that the signaling communication, that indicates the configured grant (e.g., an RRC communication, a MAC-CE communication, and/or the like), permits the UE to select the one or more transmission parameters from a plurality of different combinations of candidate transmission parameters.

As further shown in FIG. 5, and by reference number 504, the UE may transmit the UCI in the PRU based at least in part on determining to transmit the UCI. Moreover, the UE may transmit the PUSCH communication and an associated DMRS in the PRU along with the UCI. For example, the UE may time-division multiplex and/or frequency division multiplex the UCI, the PUSCH communication, and/or the associated DMRS in the PRU.

In this way, the BS may receive the UCI, the PUSCH communication, and the DMRS, may identify the one or more transmission parameters based at least in part on the UCI, and may demodulate, decode, and/or otherwise process the PUSCH communication based at least in part on the one or more transmission parameters, DMRS, and/or the like. This increases the efficiency of processing the uplink communication at the BS (e.g., by reducing demodulation and/or decoding attempts based at least in part on candidate transmission parameters), decreases dropped and/or delayed uplink communications, decreases retransmissions, and/or the like.

As indicated above, FIG. 5 is provided as one or more examples. Other examples may differ from what is described with respect to FIG. 5.

Figure 6:
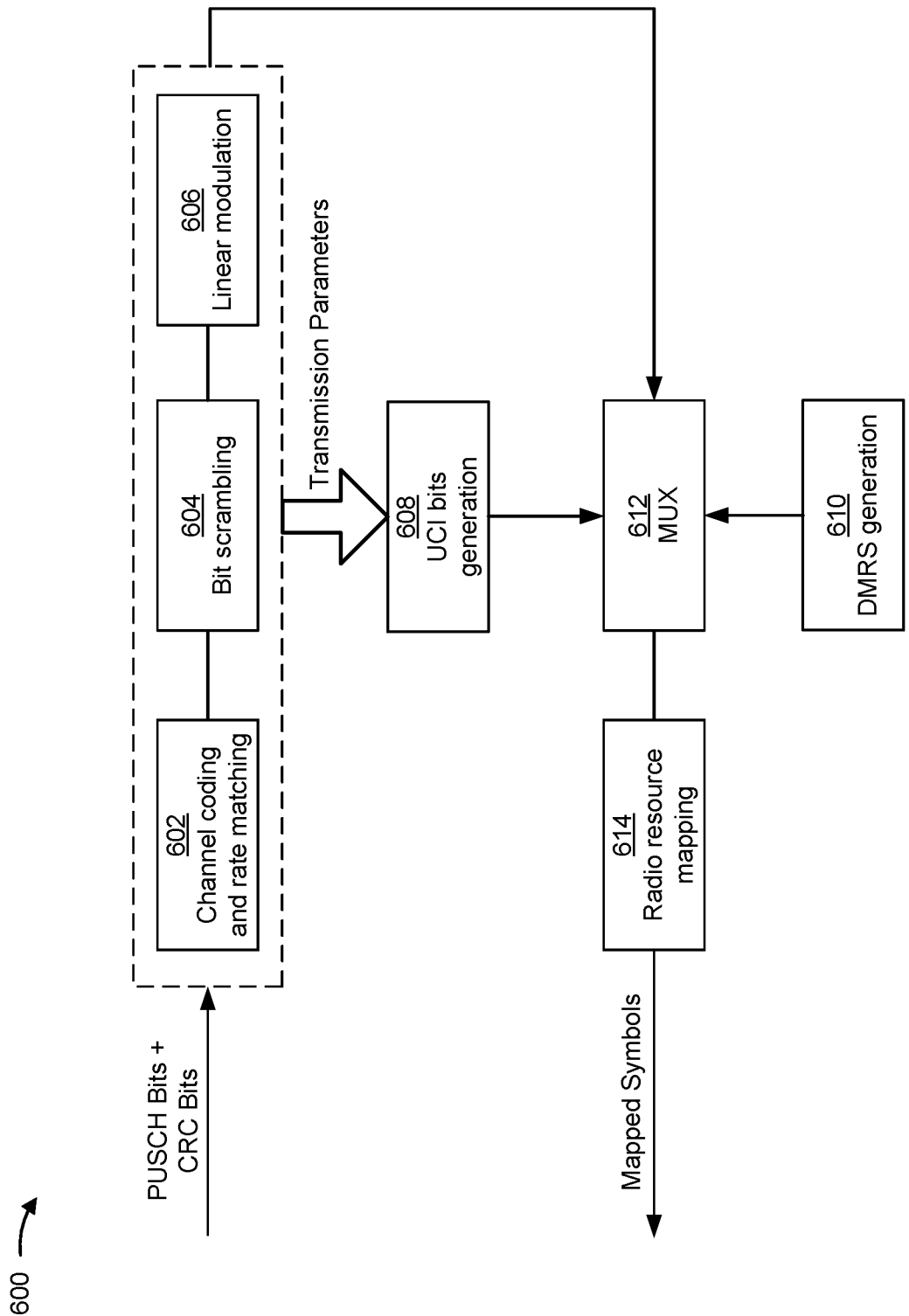

FIG. 6 is a diagram illustrating one or more examples 600 of transmitting UCI over PUSCH, in accordance with various aspects of the present disclosure.

As shown in FIG. 6, and by reference number 602, a UE may channel code and/or rate match PUSCH bits and cyclic redundancy check (CRC) bits appended to the PUSCH bits. The PUSCH bits may be one or more data bits that are to be included in a PUSCH communication that the UE is to transmit to a BS. In some aspects, the UE may select a transport block size and/or redundancy version for channel coding and/or rate matching the PUSCH bits and CRC bits.

In some aspects, the UE may channel code the PUSCH bits and CRC bits using one or more channel codes. For example, the UE may channel code the PUSCH bits and the CRC bits based at least in part on a repetition code, a simplex code, a Reed-Muller code, and/or other types of codes.

As further shown in FIG. 6, and by reference number 604, the UE may scramble the PUSCH bits and CRC bits. For example, the UE may scramble the channel coded and/or rate matched PUSCH bits and CRC bits based at least in part on an identifier associated with the UE, such as a radio network temporary identifier (RNTI) (e.g., a group common RNTI (GC-RNTI, a random access RNTI (RA-RNTI), a cell RNTI (C-RNTI), and/or the like). In some aspects, the UE may scramble the PUSCH bits and CRC bits based at least in part on a scrambling identifier, which may be determined based at least in part on an equation having a form similar to that of Equation 1:

$$\text{scrambling\_ID\_UCI} = (K_1 * \text{preamble\_resource\_index}) + (K_2 * \text{DMRS\_resource\_index}) + (K_3 * \text{PRU\_resource\_index}) \quad \text{Equation 1}$$

where scrambling_ID_UCI is the scrambling identifier, preamble_resource_index is an index associated with the RACH occasion in which the UE is to transmit a RACH preamble, DMRS_resource_index is the index associated with the time-frequency resource in which the UE is to transmit a DMRS associated with the PUSCH communication, PRU_resource_index is the index associated with the PRU in which the UE is to transmit the PUSCH communication, and $K_1$, $K_2$, and $K_3$ are positive scaling constants. The UE may initialize a scrambling sequence based at least in part on the scrambling identifier.

As further shown in FIG. 6, and by reference number 606, the UE may linearly modulate the PUSCH bits and CRC bits to generate one or more OFDM symbols that carry the PUSCH bits and CRC bits. In some aspects, the UE may select a modulation coding scheme for modulating the PUSCH bits and CRC bits. The modulation coding scheme may include, for example, binary phase-shift keying (BPSK), quadrature phase-shift keying (QPSK), quadrature amplitude modulation (QAM), and/or other types of modulation coding schemes.

As further shown in FIG. 6, and by reference number 608, the UE may generate UCI bits that are to be included in UCI that indicates transmission parameters for the channel coding, rate matching, bit scrambling, linear modulation, and/or the like described above. The UCI bits may indicate, for example, a modulation coding scheme index associated with the modulation coding scheme used to modulate the PUSCH bits and CRC bits, a redundancy version index associated with the redundancy version selected for rate matching the PUSCH bits and the CRC bits, a transport block size index associated with the transport block size for channel coding the PUSCH bits and the CRC bits, and/or the like.

In some aspects, the UE may also channel code, rate match, bit scramble, and/or linearly modulate the UCI bits in a manner similar to the PUSCH bits and CRC bits described above in connection with reference numbers 602-606. Moreover, the UE may append or attach CRC bits to the UCI bits. In this case, the UE may channel code the UCI bits and associated CRC bits based at least in part on the same channel code or different channel codes, based at least in part on the same scrambling identifier or different scrambling identifiers, based at least in part on the same modulation order or different modulation orders, and/or the like.

In some aspects, to ensure that the UCI is sufficiently compact to reduce the overhead of the UCI, the UE may determine whether the quantity of UCI bits, needed to indicate the one or more transmission parameters in the UCI, satisfies a bit quantity threshold. If the UE determines that the quantity of bits satisfies the bit quantity threshold, the UE may generate a scrambling identifier for the UCI bits based at least in part on Equation 1 above. In some aspects, if the UE determines that the quantity of bits does not satisfy the bit quantity threshold, the UE may truncate or reduce the quantity of the UCI bits in order to reduce the overhead of the UCI. For example, the UE may truncate the UCI bits based at least in part on an equation having a form similar to that of Equation 2:

$$\text{Truncated\_Bits} = [\log_2{}^W] - N \quad \text{Equation 2}$$

where W is the quantity of possible combinations for the one or more transmission parameters and N is the bit quantity threshold. In some aspects, the UE may determine whether the quantity of UCI bits, needed to indicate the one or more transmission parameters in the UCI, satisfies the bit quantity threshold based at least in part on determining whether $W > 2^N$. In some aspects, if the UE determines to truncate or reduce the quantity of bits included in the UCI bits, the UE may scramble the UCI bits by initializing a scrambling sequence (e.g., a pseudo random sequence) based at least in part on a sequence identifier that is determined based at least in part on an equation having a form similar to that of Equation 3:

$$\begin{aligned}\text{scrambling\_ID\_UCI} = \\ (K_1 * \text{preamble\_resource\_index}) + \\ (K_2 * \text{DMRS\_resource\_index}) + \\ (K_3 * \text{PRU\_resource\_index}) + K_3\end{aligned} \quad \text{Equation 3}$$

where $K_3$ represents a binary to decimal conversion of the truncated or reduced quantity of bits included in the UCI bits.

Additionally and/or alternatively, the UE may apply a CRC mask in order to mask the CRC bits attached to the UCI bits, where the CRC mask may be generated based at least in part on a pseudo random sequence that in turn may be based at least in part on the truncated or reduced quantity of bits included in the UCI bits. In some aspects, the pseudo random sequence used to generate the CRC mask, and the pseudo random sequence used to scramble the UCI bits, may be the same pseudo random sequence or different pseudo random sequences.

As further shown in FIG. 6, and by reference number 610, the UE may generate a DMRS that is to be transmitted in the PRU with the PUSCH communication and the UCI. In some aspects, the DMRS may be generated and transmitted such that the BS may perform one or more measurements of the DMRS to determine the uplink channel on which the PUSCH communication is to be transmitted. In some aspects, if the PUSCH communication is a payload portion of a msgA communication in a two-step RACH procedure, the UE may generate the DMRS based at least in part on a preamble sequence identifier associated with a RACH preamble portion of the msgA communication.

As further shown in FIG. 6, and by reference number 612, the UE may multiplex the PUSCH communication, the UCI, and/or the DMRS in the PRU. For example, the UE may time division multiplex and/or frequency division multiplex the OFDM symbols representing the PUSCH communication, the UCI, and/or the DMRS in the PRU. As further shown in FIG. 6, and by reference number 614, the UE may map the OFDM symbols representing the PUSCH communication, the UCI, and the DMRS to the OFDM symbols included in the PRU. The UE may transmit the OFDM symbols in the PRU to the BS to transmit the PUSCH communication, the UCI, and/or the DMRS to the BS.

As indicated above, FIG. 6 is provided as one or more examples. Other examples may differ from what is described with respect to FIG. 6.

Figure 7:
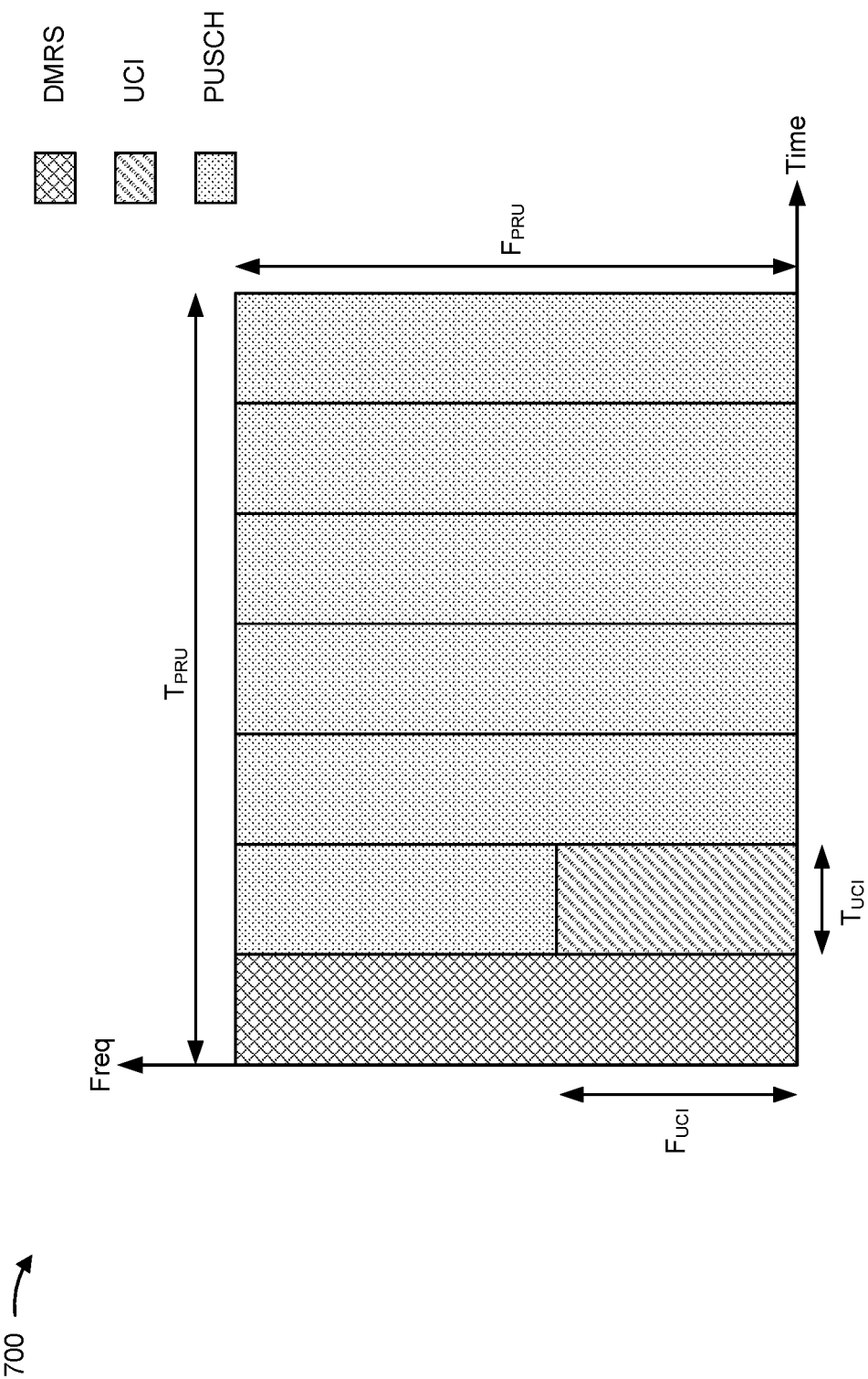

FIG. 7 is a diagram illustrating one or more examples 700 of transmitting UCI over PUSCH, in accordance with various aspects of the present disclosure. As shown in FIG. 7, an example PRU associated with a UE may include a multiplexed (e.g., time division multiplexed and/or frequency division multiplexed) DMRS, PUSCH communication, and UCI. The UCI may be configured to indicate one or more transmission parameters associated with the PUSCH communication, as described above in connection with FIGS. 5 and 6. In some aspects, modulation symbols of the PUSCH communication may be punctured or rate matched in the PRU around the one or more subcarriers and/or OFDM symbols of the UCI.

As shown in FIG. 7, the PRU may include a set of time-domain resources (e.g., $T_{PRU}$) and/or a set of frequency-domain resources (e.g., $F_{PRU}$). The UCI may occupy a subset of the time-domain resources and/or a set of frequency-domain resources included in the PRU (e.g., $T_{UCI}$ and $F_{UCI}$). As further shown in FIG. 7, the modulation symbols of the UCI may be transmitted in one or more OFDM symbols adjacent to the OFDM symbols in which the DMRS is transmitted in the PRU. In some aspects, the starting OFDM symbol and/or starting subcarrier of the UCI may be the same across PRUs in a PRU group in which the PRU is included (e.g., may start at a semi-persistent OFDM symbol index and/or subcarrier index of the PRU). In some aspects, the quantity of OFDM symbols and subcarriers across which the UCI is transmitted may be the same across PRUs in a PRU group in which the PRU is included.

As indicated above, FIG. 7 is provided as one or more examples. Other examples may differ from what is described with respect to FIG. 7.

Figure 8:
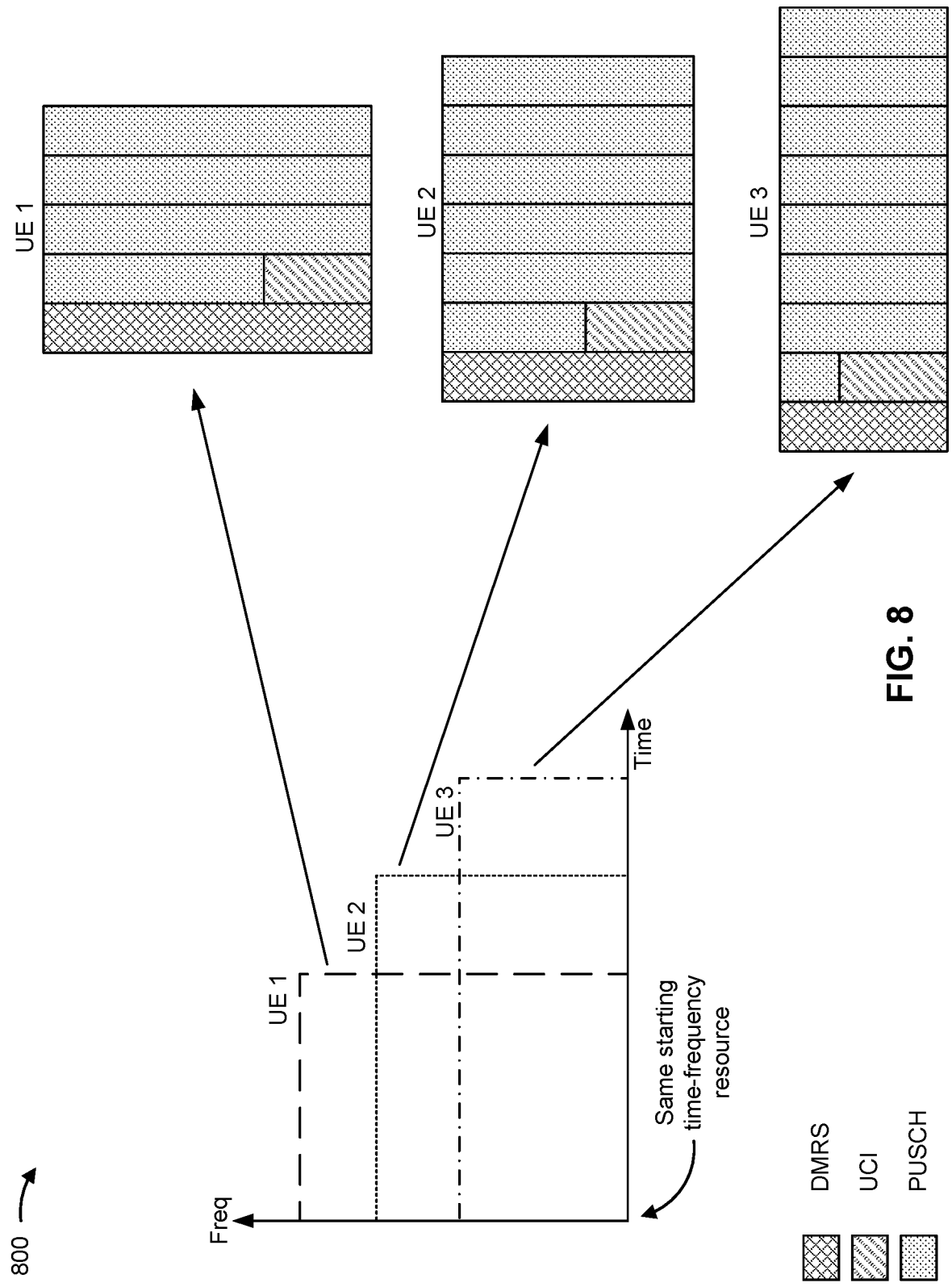

FIG. 8 is a diagram illustrating one or more examples 800 of transmitting UCI over PUSCH, in accordance with various aspects of the present disclosure. As shown in FIG. 8, an example PRU group may include a plurality of PRUs that are nested in the PRU group such that the PRUs each start at the same starting time-frequency resource (e.g., the same time-domain resource and the same frequency resource) regardless of whether the PRUs are the same size or different sizes in the time domain and/or frequency domain. Each PRU may be associated with a respective UE (e.g., UE 1, UE 2, UE 3, and so on). Moreover, the PRUs in the PRU group may be configured such that respective UCIs transmitted in each PRU occupy the same quantity of OFDM symbols and/or subcarriers, such that respective UCIs transmitted in each PRU occupy the same OFDM symbols and/or subcarriers across the PRUs, and/or the like.

As further shown in FIG. 8, the modulation symbols of the UCIs in each PRU in the PRU group may be transmitted in one or more OFDM symbols adjacent to the OFDM symbols in which the DMRS is transmitted in the PRUs. In some aspects, the starting OFDM symbol and/or starting subcarrier of each UCI may be the same across the PRUs in the PRU group (e.g., may start at a semi-persistent OFDM symbol index and/or subcarrier index of the PRU). In some aspects, the quantity of OFDM symbols and subcarriers across which the UCI is transmitted may be the same across the PRUs in the PRU group. In this way, a BS may semi-statically configure the PRUs in the PRU group, the UCIs in the PRU, and/or the like (e.g., based at least in part on a semi-static payload construction and resource mapping rule) to reduce the detection/decoding complexity of the BS.

As indicated above, FIG. 8 is provided as one or more examples. Other examples may differ from what is described with respect to FIG. 8.

Figure 9:
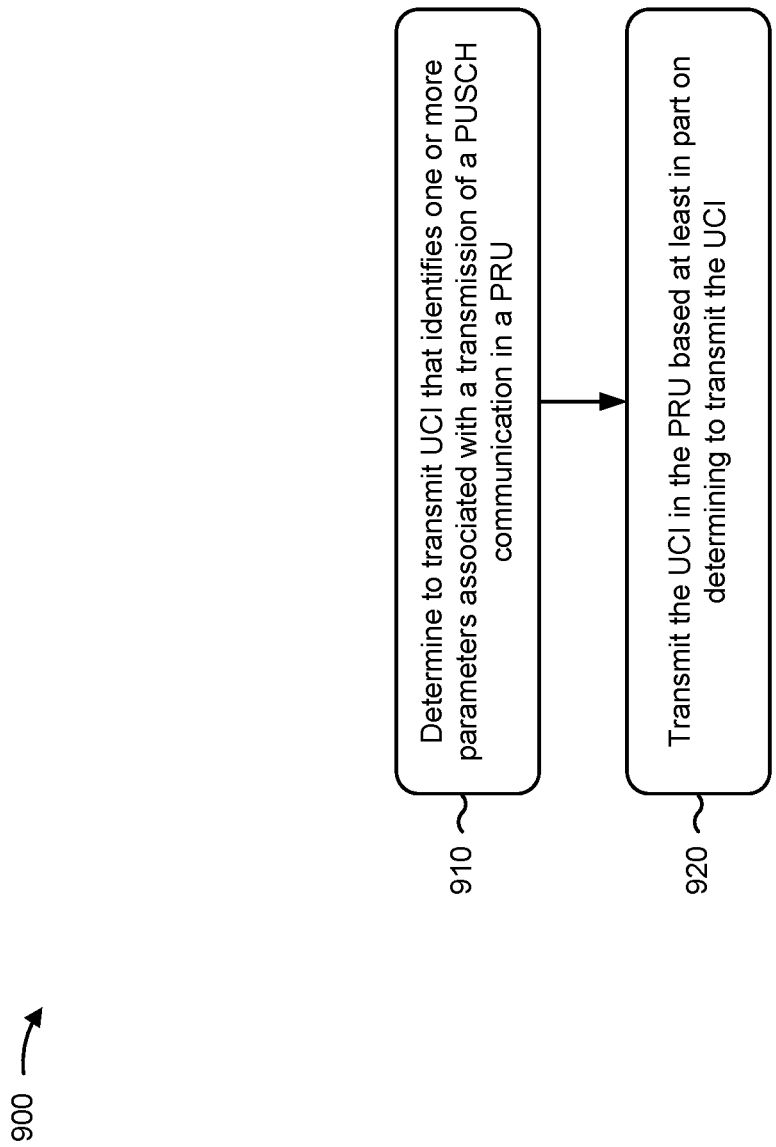
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs operations associated with transmitting UCI over PUSCH.

As shown in FIG. 9, in some aspects, process 900 may include determining to transmit UCI that identifies one or more parameters associated with a transmission of a PUSCH communication in a PRU (block 910). For example, the UE (e.g., using receive processor 258, transmit processor 264, controller/processor 280, memory 282, and/or the like) may determine to transmit UCI that identifies one or more parameters associated with a transmission of a PUSCH communication in a PRU, as described above.

As further shown in FIG. 9, in some aspects, process 900 may include transmitting the UCI in the PRU based at least in part on determining to transmit the UCI (block 920). For example, the UE (e.g., using receive processor 258, transmit processor 264, controller/processor 280, memory 282, and/or the like) may transmit the UCI in the PRU based at least in part on determining to transmit the UCI, as described above.

Process 900 may include additional aspects, such as any single aspect or any combination of aspects described below and/or in connection with one or more other processes described elsewhere herein.

In a first aspect, the one or more parameters comprise at least one of an MCS index associated with the PUSCH communication, a redundancy version associated with the PUSCH communication, or a transport block size associated with the PUSCH communication. In a second aspect, alone or in combination with the first aspect, determining to transmit the UCI comprises determining to transmit the UCI based at least in part on determining that a plurality of PRUs, included in a PRU group in which the PRU is included, are mapped to a shared set of time-domain resources and frequency-domain resources. In a third aspect, alone or in combination with one or more of the first and second aspects, the plurality of PRUs are of a same time-domain resource size and a same frequency-domain resource size.

In a fourth aspect, alone or in combination with one or more of the first through third aspects, at least a subset of the plurality of PRUs are of at least one of different time-domain resource sizes or different frequency-domain resource sizes. In a fifth aspect, alone or in combination with one or more of the first through fourth aspects, determining to transmit the UCI comprises determining to transmit the UCI based at least in part on determining that a plurality of PRUs, included in a PRU group in which the PRU is included, are nested in a time domain and a frequency domain such that the plurality of PRUs share a same starting time-domain resource and a same starting frequency-domain resource.

In a sixth aspect, alone or in combination with one or more of the first through fifth aspects, the PUSCH communication includes a payload of a msgA communication in a contention-free two-step RACH procedure, and process 900 further comprises receiving an indication of the PRU in a DCI communication, the DCI communication being at least one of a compact DCI communication or a group-common DCI communication. In a seventh aspect, alone or in combination with one or more of the first through sixth aspects, the PUSCH communication includes a payload of a msgA communication in a two-step RACH procedure, and determining to transmit the UCI comprises determining to transmit the UCI based at least in part on determining that a combination of the PRU and a preamble of the msgA communication is associated with a plurality of different combinations of the one or more parameters.

In an eighth aspect, alone or in combination with one or more of the first through seventh aspects, the transmission of the PUSCH communication is scheduled by a configured grant, and determining to transmit the UCI comprises determining to transmit the UCI based at least in part on determining that a signaling communication, that indicates the configured grant, permits the UE to select the one or more parameters from a plurality of different combinations of the one or more parameters. In a ninth aspect, alone or in combination with one or more of the first through eighth aspects, the transmission of the PUSCH communication is triggered by a contention based random access event, and determining to transmit the UCI comprises determining to transmit the UCI based at least in part on the contention based random access event.

In a tenth aspect, alone or in combination with one or more of the first through ninth aspects, the one or more parameters are indicated in the UCI by a plurality of bits, the plurality of bits being encoded by a channel code to form coded bits. In an eleventh aspect, alone or in combination with one or more of the first through tenth aspects, process 900 further comprises attaching, prior to channel coding the UCI, one or more CRC bits to the plurality of bits. In a twelfth aspect, alone or in combination with one or more of the first through eleventh aspects, process 900 further comprises determining that a quantity of bits, of the plurality of bits, does not satisfy a bit quantity threshold, and reducing the quantity of bits to a reduced quantity of bits based at least in part on determining that the quantity of bits does not satisfy the bit quantity threshold.

In a thirteenth aspect, alone or in combination with one or more of the first through twelfth aspects, process 900 further comprises at least one of masking the CRC bits based at least in part on a first pseudo random sequence that is based at least in part on the reduced quantity of bits, or scrambling the coded bits using a second pseudo random sequence that is based at least in part on the reduced quantity of bits, and scrambling the UCI based at least in part on the reduced quantity of bits comprises initializing a scrambling sequence generator based at least in part on the reduced quantity of bits and scrambling the UCI based at least in part on the scrambling sequence.

In a fourteenth aspect, alone or in combination with one or more of the first through thirteenth aspects, transmitting the UCI in the PRU comprises transmitting one or more modulation symbols of the UCI in one or more OFDM symbols adjacent to a transmission of a demodulation reference signal in the PRU and in one or more subcarriers that start at a semi-persistent subcarrier index of the PRU. In a fifteenth aspect, alone or in combination with one or more of the first through fourteenth aspects, a quantity of the one or more subcarriers is a same quantity of subcarriers for each PRU included in a PRU group in which the PRU is included, and modulation symbols of the PUSCH communication are punctured or rate matched in the PRU around the one or more subcarriers.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
 a memory; and
 one or more processors coupled with the memory, the one or more processors configured to:
  receive downlink control information (DCI) that includes an indication of a physical uplink shared channel (PUSCH) resource unit (PRU) for a PUSCH communication;
  transmit the PUSCH communication in the PRU, wherein the PUSCH communication includes a payload of a msgA communication in a contention-free two-step random access channel (RACH) procedure and uplink control information (UCI) multiplexed in the PUSCH communication, the UCI identifies one or more parameters associated with the PUSCH communication; and
  determine that a combination of the PRU and a preamble of the msgA communication is associated with a plurality of different combinations of the one or more parameters, wherein the PUSCH communication includes the UCI based at least in part on the combination of the PRU and the preamble of the msgA communication being associated with the plurality of different combinations of the one or more parameters.

2. The UE of claim 1, wherein the one or more parameters comprise at least one of:
 a modulation coding scheme index associated with the PUSCH communication,
 a redundancy version associated with the PUSCH communication, or
 a transport block size associated with the PUSCH communication.

3. The UE of claim 1, wherein the one or more processors are further configured to:
 determine that a plurality of PRUs, included in a PRU group in which the PRU is included, are mapped to a shared set of time-domain resources and frequency-domain resources, wherein the PUSCH communication includes the UCI based at least in part on the plurality of PRUs being mapped to the shared set of time-domain resources and frequency-domain resources.

4. The UE of claim 3, wherein the plurality of PRUs have a same time-domain resource size and a same frequency-domain resource size.

5. The UE of claim 3, wherein at least a subset of the plurality of PRUs have at least one of different time-domain resource sizes or different frequency-domain resource sizes.

6. The UE of claim 1, wherein the one or more processors are further configured to:
determine that a plurality of PRUs, included in a PRU group in which the PRU is included, are nested in a time domain and a frequency domain such that the plurality of PRUs share a same starting time-domain resource and a same starting frequency-domain resource, wherein the PUSCH communication includes the UCI based at least in part on the plurality of PRUs being nested in the time domain and the frequency domain such that the plurality of PRUs share the same starting time-domain resource and the same starting frequency-domain resource.

7. The UE of claim 1, wherein the one or more parameters are indicated by a plurality of bits, and wherein the one or more processors are further configured to:
attach one or more cyclic redundancy check (CRC) bits to the plurality of bits to form a group of bits; and
channel code the group of bits to form coded bits.

8. The UE of claim 7, wherein the one or more processors are further configured to:
determine that a quantity of bits, of the plurality of bits, fails to satisfy a bit quantity threshold; and
reduce the quantity of bits to a reduced quantity of bits based at least in part on the quantity of bits failing to satisfy the bit quantity threshold.

9. The UE of claim 8, wherein the one or more processors are further configured to:
mask the one or more CRC bits based at least in part on a pseudo-random sequence that is based at least in part on the reduced quantity of bits.

10. The UE of claim 8, wherein the one or more processors are further configured to:
scramble the coded bits using a pseudo-random sequence that is based at least in part on the reduced quantity of bits.

11. The UE of claim 1, wherein one or more modulation symbols of the UCI are transmitted in one or more orthogonal frequency division multiplexing (OFDM) symbols adjacent to a transmission of a demodulation reference signal in the PRU and in one or more subcarriers that start at a semi-persistent subcarrier index of the PRU.

12. The UE of claim 11, wherein modulation symbols of the PUSCH communication are punctured or rate matched in the PRU around the one or more subcarriers.

13. The UE of claim 11, wherein a quantity of the one or more subcarriers is a same quantity of subcarriers for each PRU included in a PRU group in which the PRU is included.

14. A method of wireless communication performed by a user equipment (UE), comprising:
receiving downlink control information (DCI) that includes an indication of a physical uplink shared channel (PUSCH) resource unit (PRU) for a PUSCH communication;
transmitting the PUSCH communication in the PRU, wherein the PUSCH communication includes a payload of a msgA communication in a contention-free two-step random access channel (RACH) procedure and uplink control information (UCI) multiplexed in the PUSCH communication, the UCI identifies one or more parameters associated with the PUSCH communication; and
determining that a combination of the PRU and a preamble of the msgA communication is associated with a plurality of different combinations of the one or more parameters, wherein the PUSCH communication includes the UCI based at least in part on the combination of the PRU and the preamble of the msgA communication being associated with the plurality of different combinations of the one or more parameters.

15. The method of claim 14, wherein the one or more parameters comprise at least one of:
a modulation coding scheme index associated with the PUSCH communication,
a redundancy version associated with the PUSCH communication, or
a transport block size associated with the PUSCH communication.

16. The method of claim 14, further comprising:
determining that a plurality of PRUs, included in a PRU group in which the PRU is included, are mapped to a shared set of time-domain resources and frequency-domain resources, wherein the PUSCH communication includes the UCI based at least in part on the plurality of PRUs being mapped to the shared set of time-domain resources and frequency-domain resources.

17. The method of claim 16, wherein the plurality of PRUs comprise a same time-domain resource size and a same frequency-domain resource size.

18. The method of claim 16, wherein at least a subset of the plurality of PRUs are of at least one of different time-domain resource sizes or different frequency-domain resource sizes.

19. The method of claim 14, further comprising:
determining that a plurality of PRUs, included in a PRU group in which the PRU is included, are nested in a time domain and a frequency domain such that the plurality of PRUs share a same starting time-domain resource and a same starting frequency-domain resource, wherein the PUSCH communication includes the UCI based at least in part on the plurality of PRUs being nested in the time domain and the frequency domain such that the plurality of PRUs share the same starting time-domain resource and the same starting frequency-domain resource.

20. The method of claim 14, wherein the one or more parameters are indicated by a plurality of bits, wherein the method further comprises:
attaching one or more cyclic redundancy check (CRC) bits to the plurality of bits to form a group of bits; and
channel coding the group of bits to form coded bits.

21. The method of claim 20, further:
determining that a quantity of bits, of the plurality of bits, fails to satisfy a bit quantity threshold; and
reducing the quantity of bits to a reduced quantity of bits based at least in part on the quantity of bits failing to satisfy the bit quantity threshold.

22. The method of claim 21, further comprising:
masking the one or more CRC bits based at least in part on a pseudo-random sequence that is based at least in part on the reduced quantity of bits.

23. The method of claim 21, further comprising:
scrambling the coded bits using a pseudo-random sequence that is based at least in part on the reduced quantity of bits.

24. The method of claim 14, wherein one or more modulation symbols of the UCI are transmitted in one or more orthogonal frequency division multiplexing (OFDM) symbols adjacent to a transmission of a demodulation reference signal in the PRU and in one or more subcarriers that start at a semi-persistent subcarrier index of the PRU.

25. The method of claim 24, wherein modulation symbols of the PUSCH communication are punctured or rate matched in the PRU around the one or more subcarriers.

26. The method of claim 24, wherein a quantity of the one or more subcarriers is a same quantity of subcarriers for each PRU included in a PRU group in which the PRU is included.

27. A non-transitory computer-readable medium storing a set of instructions for wireless communication, the set of instructions comprising:
- one or more instructions that, when executed by one or more processors of a user equipment (UE), cause the UE to:
  - receive downlink control information (DCI) that includes an indication of a physical uplink shared channel (PUSCH) resource unit (PRU) for a PUSCH communication;
  - transmit the PUSCH communication in the PRU, wherein the PUSCH communication includes a payload of a msgA communication in a contention-free two-step random access channel (RACH) procedure and uplink control information (UCI) multiplexed in the PUSCH communication, the UCI identifies one or more parameters associated with the PUSCH communication; and
  - determine that a combination of the PRU and a preamble of the msgA communication is associated with a plurality of different combinations of the one or more parameters, wherein the PUSCH communication includes the UCI based at least in part on the combination of the PRU and the preamble of the msgA communication being associated with the plurality of different combinations of the one or more parameters.

28. An apparatus for wireless communication, comprising:
- means for receiving downlink control information (DCI) that includes an indication of a physical uplink shared channel (PUSCH) resource unit (PRU) for a PUSCH communication;
- means for transmitting the PUSCH communication in the PRU, wherein the PUSCH communication includes a payload of a msgA communication in a contention-free two-step random access channel (RACH) procedure and uplink control information (UCI) multiplexed in the PUSCH communication, the UCI identifies one or more parameters associated with the PUSCH communication; and
- means for determining that a combination of the PRU and a preamble of the msgA communication is associated with a plurality of different combinations of the one or more parameters, wherein the PUSCH communication includes the UCI based at least in part on the combination of the PRU and the preamble of the msgA communication being associated with the plurality of different combinations of the one or more parameters.

* * * * *